United States Patent [19]

Dunn

[11] 4,198,061
[45] Apr. 15, 1980

[54] ELECTROSTATIC-VACUUM RECORD CLEANING APPARATUS

[76] Inventor: Robert E. Dunn, P.O. Box 928, Dixon, Calif. 95620

[21] Appl. No.: 883,500

[22] Filed: Mar. 6, 1978

[51] Int. Cl.² .................. B08B 6/00; B08B 5/04; G11B 3/58
[52] U.S. Cl. ................... 274/47; 15/1.5 R; 15/306 R
[58] Field of Search ............... 134/1, 21, 33, 34, 37; 15/1.5 R, 345, 306 R; 274/47; 361/226

[56] References Cited

U.S. PATENT DOCUMENTS

| 2,338,842 | 1/1944 | Glaser et al. | 15/1.5 R X |
|---|---|---|---|
| 2,576,047 | 11/1951 | Schaffert | 15/1.5 R X |
| 2,582,939 | 1/1952 | Frederick | 15/1.5 R X |
| 2,825,078 | 3/1958 | Bugler et al. | 134/1 X |
| 2,832,977 | 5/1958 | Walkup et al. | 15/1.5 R |
| 3,218,082 | 11/1965 | Taylor et al. | 274/47 |
| 3,239,863 | 3/1966 | Gardner | 15/1.5 R |
| 3,290,045 | 12/1966 | Moore et al. | 274/47 |
| 3,395,042 | 7/1968 | Herbert, Jr. | 15/1.5 R |
| 3,536,528 | 10/1970 | De Geest | 134/1 |
| 3,634,726 | 1/1972 | Jay | 361/220 |
| 3,643,128 | 2/1972 | Testone | 361/230 |
| 3,654,660 | 4/1972 | Taylor et al. | 274/47 X |
| 3,897,069 | 7/1975 | Lee | 274/47 |
| 3,945,647 | 3/1976 | Rangabe | 274/47 |
| 4,083,073 | 4/1978 | Bernardini | 274/47 |
| 4,101,999 | 7/1978 | Doyel | 15/1.5 R |

FOREIGN PATENT DOCUMENTS 1925859  12/1969  Fed. Rep. of Germany ............ 15/345

Primary Examiner—Richard V. Fisher
Attorney, Agent, or Firm—Fulwider, Patton, Rieber, Lee & Utecht

[57] ABSTRACT

An apparatus for cleaning record disks in which the disks are held by a turntable and rotated beneath a mechanism that imparts an electrostatic charge to dust particles on the information bearing surfaces. The charged and thus loosened particles are removed by a vacuum device. A blower and an attraction member charged oppositely to the particles further enhance the cleaning action of the vacuum.

17 Claims, 5 Drawing Figures

U.S. Patent
Apr. 15, 1980
4,198,061
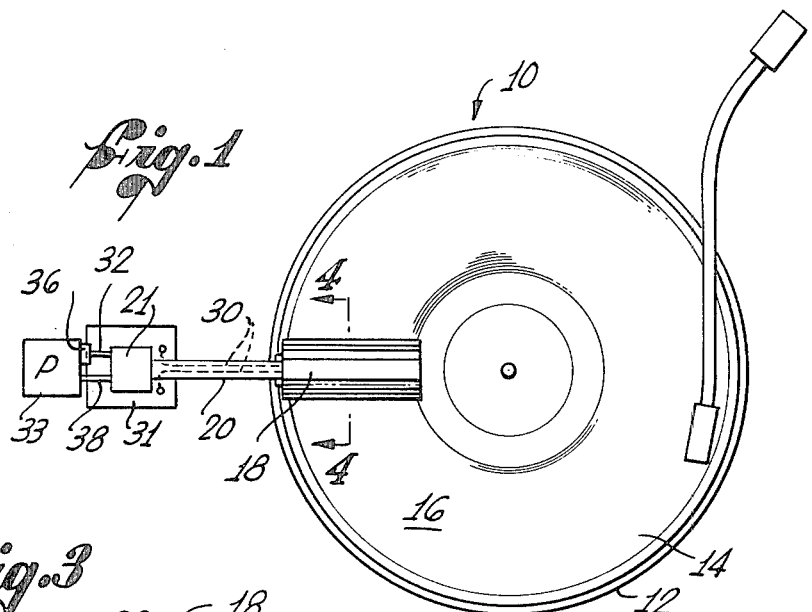
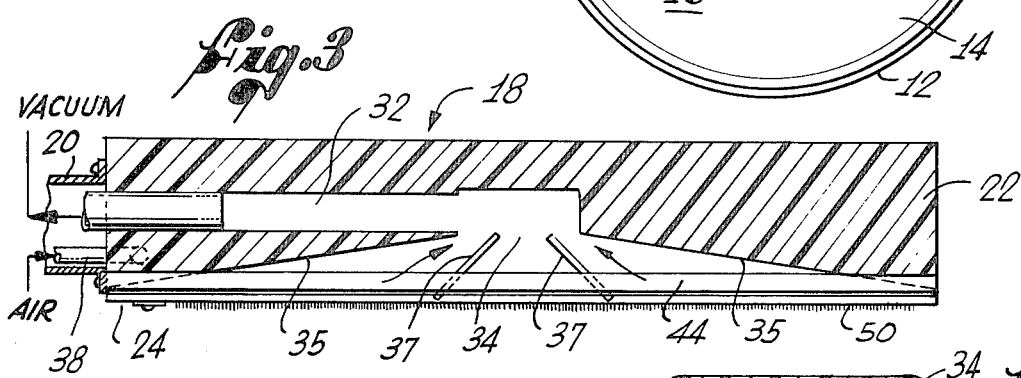
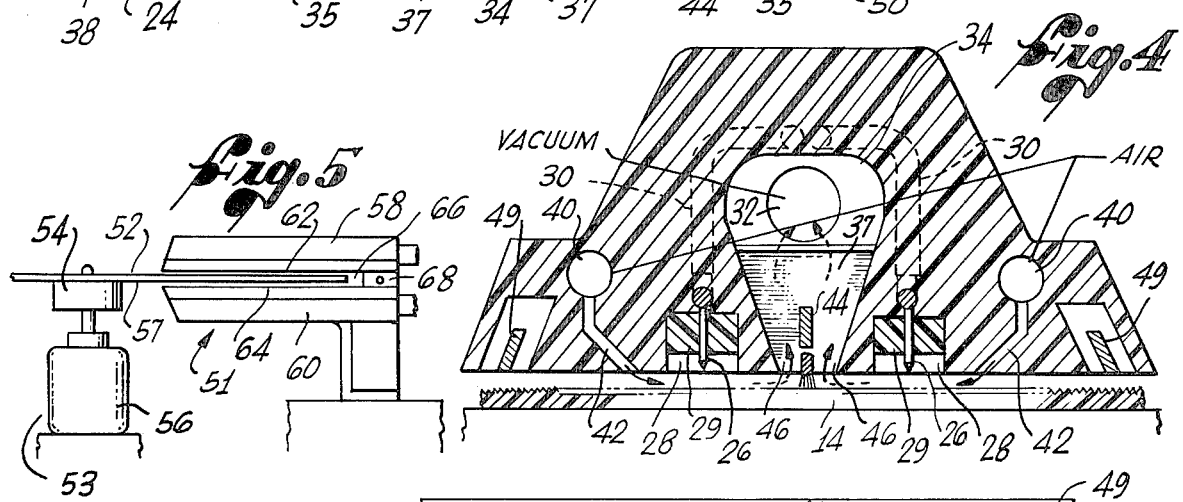
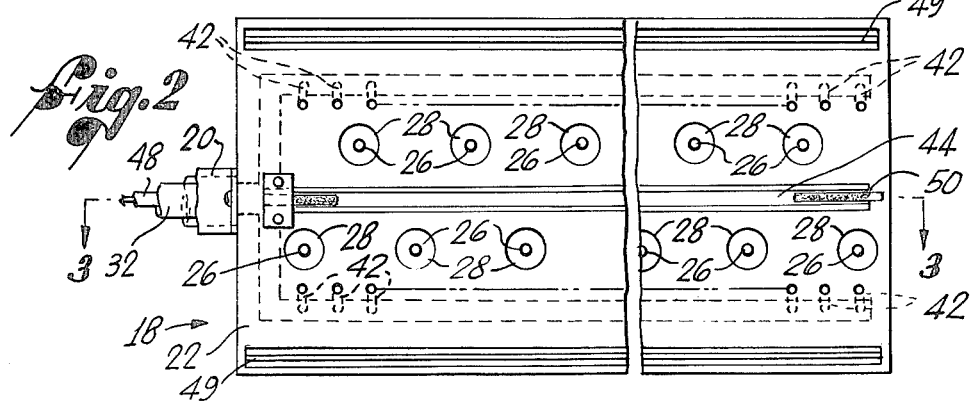

ELECTROSTATIC-VACUUM RECORD CLEANING APPARATUS

BACKGROUND OF THE INVENTION

The present invention relates to the cleaning of record disks and the like, and more particularly to an apparatus for cleaning such disks by a combination of electrostatic forces and air movement.

It is well known that conventional record disks, such as phonograph records, will last longer and produce better, clearer sound with less static and other background noises and fewer spurious signals if the information bearing or playing surfaces are kept free of dust particles. Previous efforts to remove these particles have usually involved some form of brushing, wiping or washing, always relying upon contact between the playing surface and the cleaning apparatus or liquid cleaning medium. No matter how carefully and skillfully the cleaning process is performed, some deterioration of the playing surface necessarily results.

A primary objective of the present invention is to clean record disks with reduced contact with the playing surfaces or with no such contact at all. It is a further objective of the invention to accomplish the removal of dust from record disks easily and conveniently without the need for special skills or costly equipment.

SUMMARY OF THE INVENTION

The present invention resides in a unique record-cleaning apparatus employing a turntable on which the record is supported and rotated beneath a charging mechanism that imparts an electrostatic charge, causing dust particles on the playing surface to be loosened. A vacuum device, supported above the playing surface adjacent the charging device, causes the loosened particles to be removed and carried away by air movement. This apparatus can be used by itself to clean records without deterioration of their playing surfaces or it can be used in conjunction with a more conventional cleaning device, such as a brush.

To aid in dislodging the dust particles, it is advantageous to employ an air blower located adjacent the charging device. An attraction member, charged oppositely to the particles, can pull the particles away from the record and toward the vacuum. An additional conductor to which an alternating current is applied can be employed to remove any residual charge from the record, thereby preventing additional dust particles from being attracted to the record.

In a preferred arrangement, the charging device utilizes rows of metallic charging elements mounted on a housing, the rows being oriented radially with respect to the record. The blower, vacuum device and attraction member are oriented parallel to the charging element rows. The housing may define a cavity that forms part of the vacuum device with the attraction member disposed within the cavity. The turntable may be of the conventional phonograph type.

In one arrangement, the playing surfaces of the record extend beyond a relatively small turntable between two opposed heads of the type described below. In this manner, both sides of a record can be cleaned simultaneously.

Other features and advantages of the present invention will become apparent from the following detailed description, taken in conjunction with the accompanying drawings which illustrate, by way of example, the principles of the invention.

BRIEF DESCRIPTION OF THE DRAWINGS

FIG. 1 is a top elevational view of a record disk cleaning apparatus constructed in accordance with the present invention;

FIG. 2 is an enlarged fragmentary bottom view of the cleaning head of the apparatus shown in FIG. 1;

FIG. 3 is an enlarged cross-sectional view of the cleaning head taken substantially along the line 3—3 of FIG. 2;

FIG. 4 is an enlarged cross-sectional view of the cleaning head taken substantially along the line 4—4 of FIG. 2; and FIG. 5 is a fragmentary side view of a second record disk cleaning apparatus also constructed in accordance with the invention.

DETAILED DESCRIPTION OF THE PREFERRED EMBODIMENT

A record disk cleaning apparatus 10 that embodies many novel features of the present invention is illustrated in FIGS. 1-4 of the accompanying drawings. It includes a conventional phonograph turntable 12 on which a conventional, rigid, grooved record disk 14 made of electrically insulating plastic material is supported horizontally and rotated with its upwardly facing playing surface 16 exposed. The disk 14 may contain video or other types of information instead of conventional audio information. A record-cleaning head 18 is supported above the disk 14 by a horizontal arm 20 attached at its opposite end to a vertical stanchion 21 (the top end of which is visible in FIG. 1). The cleaning head 18 itself, best shown in FIGS. 2, 3 and 4, includes an elongated plastic housing 22 that extends radially from the peripheral edge of the disk 14, at the outer end of the arm 20, toward the center of the disk. The housing 22 has a flat bottom surface 24 slightly spaced above the upper playing surface 16 of the disk 14. Projecting downwardly from the head 18 are a plurality of short, metallic needles 26 arranged in a comb-like manner in two rows that are near the side edges of the housing 22 and oriented substantially radially with respect to the disk 14. Each needle 26 is contained within a small recess 28 in the bottom surface 24 of the housing 22 and extends within 2 to 4 mms. of the disk 14. It is important, however, that the needles 26 do not touch the disk 14.

The needles 26 form the charging elements of a charging device that imparts an electrostatic charge to dust particles on the surface 16 of the disk 14. To serve this purpose, the needles 26 of each row are electrically interconnected by a metallic strip 29 to which they are secured and an electrical wire 30 running along the arm 20 connects the strips to an electrostatic generator 31. The needles 26 are sharply pointed to reduce the minimum required voltage. As the disk 14 moves beneath the needles 26, the electrostatic charge is "sprayed" onto the dust particles carried by the playing surface 16 and onto the grooved playing surface itself. This charge loosens the dust particles, which are repelled from the like-charged surface 16 and other particles, and elongated or fibrous particles are caused to stand on end rather than lying flat on the record surface.

The dust particles thus loosened from the playing surface 16 are removed by a vacuum device which consists of a conduit 32 leading from an air pump 33 along the arm 20 into the housing 22 and to the longitudinal center of an elongated cavity 34 (shown in cross section in FIG. 3) formed horizontally along the bottom surface 24 of the housing 22 so that the cavity extends radially with respect to the disk 14. The cavity 34 is of maximum height at its mid point and its top surfaces 35 taper downwardly toward the ends of the head 18, as shown in FIG. 3. As the dust is drawn toward the area of reduced air pressure adjacent the record 14, it enters the cavity 34, moves through the conduit 32 and is trapped by a filter 36. An even pressure distribution within the cavity 34 is achieved by a pair of baffles 37 which extend across the cavity from side to side. They form an angle of about 45 degrees with the horizontal, being closer together at their upper ends.

To enhance the cleaning action of the apparatus 10, the exhaust, or high pressure side of the pump 33 is connected to a second conduit 38 that extends along the arm to two passageways 40 running along the sides of the housing 22 to a series of air outlets 42 in the bottom 24 of the housing, as best shown in FIG. 4. These outlets 42 are arranged in two rows parallel to the rows of needles 26, one row of outlets being disposed on each side of the housing bottom surface 24 outwardly from the needles 26, as shown in FIGS. 2–4. Each outlet 42 is inclined inwardly toward the longitudinal center of the housing 18 and acts as a nozzle of a blower unit that tends to agitate the dust particles and lift them off the disk 14 for interaction with the vacuum. Preferably, the outlets 42 of a single row are located about 3 mm. apart and from an angle of about 30 to 45 degrees with the playing surface 16.

Giving still greater effectiveness to the vacuum is an elongated, flat, metallic attraction member 44 disposed lontitudinally within the cavity 34 and presenting a knife edge that extends radially above the record surface 16. The width of the attraction member 44 is substantially less than that of the cavity 34, leaving an air passage or slot 46 along each side for air and dust to flow into the vacuum air conduit 32. The attraction member 44 is connected by an electrical conductor 48 to the generator 31 to charge it electrostatically with a polarity opposite that of the needles 26 and the dust particles. Accordingly, dust is drawn toward the attraction member 44 and hence directly into the path of the vacuum. Any particles that reach the attraction member 44 without being diverted by the vaccum are recharged and repelled by the attraction member and are then pulled away by the vacuum. Although substantial cleaning activity can take place in the absence of the attraction member 44, its presence is desirable for maximum efficiency and effectiveness.

A pair of narrow metal strips 49 extend radially across the disk 14 on either edge of the head 18 and are attached to an alternating current source (not shown). The purpose of these strips 49 is to make the disk electrically neutral prior to cleaning and to remove any residual electrostatic charges from the disk 14 so that additional dust particles are not attracted to it.

Although the apparatus 10 can be used in such a way that all contact with the playing surface 16 is avoided, it is also possible to use it in conjunction with an elongated, radial, removable brush 50 suspended beneath attraction member 14 (shown in FIGS. 3 and 4 and partially shown in FIG. 2) that mechanically agitates and loosens the dust particles. While the brush 50 must contact the record surface 16, this contact can be much less than would be required if it were used alone. Generally, use of the brush 50 is desirable only when the record disk 14 to be cleaned is contaminated by a particularly heavy dust layer.

Another form of the invention is represented by a second exemplary embodiment illustrated in FIG. 5. In this apparatus 51, a record disk 52 is supported horizontally by a turntable 53 having a relatively small rotatable platform 54 mounted atop a drive motor 56. Only the center portions of the lower record surface 57 which is usually covered by a label, rest on the platform 54, so that the entire playing or information bearing portion of both the upper and lower surfaces are exposed for cleaning.

The apparatus 51 includes upper and lower cleaning heads 58 and 60 with opposed cleaning surfaces 62 and 64 that define a horizontal gap 66 in which the disk 52 is inserted. These heads 58 and 60 are each of the same construction as the head 18 described above and remove dust particles from both playing surfaces of the disk 52 simultaneously. The upper head 58 is pivotable above a hinge 68 at its outer end so that it can be lifted to permit insertion and removal of the disk 52.

It will be understood from the foregoing that the present invention provides a simple and convenient record disk cleaning apparatus that does not excessively wear or damage the information bearing surface, but does provide highly effective cleaning action for improved sound and long record life. While the invention has been described in connection with several specific embodiments, it will be understood by those skilled in the art that modifications and changes can be made without departing from the spirit and scope of the invention as defined by the appended claims.

I claim:

1. An apparatus for cleaning rigid information-bearing record disks comprising:
    a turntable for supporting and rotating said record disk to be cleaned;
    a housing extending over an exposed information-bearing surface of said record disk;
    charging means for imparting an electrostatic charge to dust particles on said surface, said charging means comprising a plurality of charging elements mounted on said housing, arrayed in at least one row extending in a substantially radial direction with respect to said record disk, and spaced from said surface; and
    attraction means for electrostatically attracting particles that have been charged by said charging means, said attraction means comprising at least one attraction member to which an electrostatic charge is imparted, said attraction member being supported by said housing parallel to said row of charging elements.

2. The apparatus of claim 1 wherein each of said charging elements is pointed.

3. The apparatus of claim 1 further comprising blower means carried by said housing for causing air movement to transport said charged particles away from said surface.

4. The apparatus of claim 1 further comprising blower means for blowing air on a portion of said surface adjacent said charging means to dislodge particles therefrom.

5. The apparatus of claim 1 further comprising means for causing air movement to transport said charged particles away from said surface.

6. The apparatus of claim 1 further comprising vacuum means for creating an area of reduced air pressure adjacent said surface, thereby causing particles to move away from said surface.

7. The apparatus of claim 1 further comprising vacuum means for creating an area of reduced air pressure adjacent said surface and parallel to said rows of charging elements, thereby causing said particles to move away from said surface and toward said vacuum means, said vacuum means comprising an elongated cavity within said housing and opening toward said surface.

8. The apparatus of claim 1 wherein said charging means are arranged in at least two rows extending in a substantially radial direction with respect to said record disk and said attraction means is disposed between said rows.

9. An apparatus for cleaning rigid information-bearing record disks comprising:
a turntable for supporting and rotating a record disk to be cleaned;
a housing extending over an exposed information-bearing surface of said record disk;
charging means for imparting an electrostatic charge to dust particles on said surface, said charging means comprising a plurality of charging elements mounted on said housing, spaced from said surface, and arrayed in two parallel rows that are oriented substantially radially with respect to said disk;
blower means for blowing air on a portion of said surface to dislodge said particles therefrom, said blower means comprising a plurality of air outlets formed in said housing and arranged in two rows parallel to and spaced outwardly from said rows of charging elements;
vacuum means for creating an area of reduced air pressure adjacent said surface and parallel to said rows of charging elements, thereby causing said particles to move away from said surface and toward said vacuum means, said vacuum means comprising an elongated cavity within said housing, opening toward said surface, and disposed parallel to and between said rows of air outlets; and
attraction means spaced from said surface for electrostatically attracting particles that have been charged by said charging means, said attraction means comprising an elongated metallic attraction member to which an electrostatic charge opposite to that of said charging means is imparted, said attraction member being disposed longitudinally within said cavity leaving on each side thereof an elongate slot for passage of air.

10. An apparatus for cleaning rigid information-bearing record disks comprising:
a turntable for supporting and rotating a record disk to be cleaned;
a housing extending over an exposed information-bearing surface of said record disk;
charging means for imparting an electrostatic charge to dust particles on said surface, said charging means comprising a plurality of charging elements mounted on said housing, spaced from said surface, and arrayed in two parallel rows that are oriented substantially radially with respect to said disk;
blower means for blowing air on a portion of said surface to dislodge said particles therefrom, said blower means comprising a plurality of air outlets formed in said housing and arranged in two rows parallel to and spaced outwardly from said rows of charging elements;
vacuum means for creating an area of reduced air pressure adjacent said surface and parallel to said rows of charging elements, thereby causing said particles to move away from said surface and toward said vacuum means, said vacuum means comprising an elongated cavity within said housing, opening toward said surface, and disposed parallel to and between said rows of air outlets; and
attraction means mounted on said housing for electrostatically attracting particles that have been charged by said charging means, said attraction means being disposed between said rows of charging elements.

11. A record disk cleaning apparatus comprising:
a turntable for supporting and rotating a record disk to be cleaned;
a housing extending adjacent an exposed information bearing surface of said disk;
charging means for imparting an electrostatic charge to dust particles on said surface, said charging means comprising a plurality of charging elements mounted on said housing, arrayed in a row extending in a substantially radial direction with respect to said record, and spaced from said surface;
blower means for blowing air on a portion of said surface parallel to said array of charging elements to dislodge said particles therefrom;
vacuum means for creating an area of reduced air pressure adjacent said surface and parallel to said array of charging elements, thereby causing said particles to move away from said surface and toward said vacuum means; and
attraction means for electrostatically attracting particles that have been charged by said charging means, said attraction means comprising at least one attraction member to which an electrostatic charge is imparted, said attaction member being supported by said housing adjacent said vacuum means, parallel to said row of charging elements, and spaced from said surface.

12. The apparatus of claim 11 wherein said charging means is disposed between said blower means and said vacuum means.

13. The aparatus of claim 11 wherein said blower means comprises an array of air outlets in said housing forming an angle of about 30 to 45 degrees with said surface.

14. The apparatus of claim 11 wherein:
said vacuum means includes an elongated cavity defined by said housing that is radially oriented with respect to said disk; and
said attraction member is elongated and disposed longitudinally within said cavity.

15. The apparatus of claim 11 wherein said charging means is spaced from said surface by about 2 to 4 mm.

16. A record disk cleaning apparatus comprising:
a turntable for supporting and rotating a record disk to be cleaned;
a housing extending over an exposed information bearing surface of said record disk;
charging means for imparting an electrostatic charge to dust particles on said surface, said charging means comprising a plurality of metallic charging elements mounted on said housing, spaced about 2 to 4 mm. from said surface, and arrayed in two parallel rows that are oriented substantially radially with respect to said disk;

blower means for blowing air on a portion of said surface to dislodge said particles therefrom, said blower means comprising a plurality of air outlets spaced no more than about 3 mm. apart, formed in said housing and arranged in two rows parallel to and spaced outwardly from said rows of charging elements, said outlets forming an angle of about 30 to 45 degrees with said surface;

vacuum means for creating an area of reduced air pressure adjacent said surface and parallel to said rows of charging elements, thereby causing said particles to move away from said surface and toward said vacuum means, said vacuum means comprising an elongated cavity within said housing, opening toward said surface, and disposed parallel to and between said rows of air outlets; and attraction means spaced from said surface for electrostatically attracting particles that have been charged by said charging means, said attraction means comprising an elongated metallic attraction member to which an electrostatic charge opposite to that of said charging means is imparted, said attraction member being disposed longitudinally within said cavity leaving on each side thereof an elongated slot for the passage of air and presenting a knife edge extending radially across said disk.

17. A record disk cleaning apparatus comprising:

a turntable for supporting and rotating a record disk to be cleaned;

a pair of cleaning heads extending across two exposed information bearing surfaces on opposite sides of said disk;

charging means associated with each of said heads for imparting an electrostatic charge to dust particles on said playing surfaces, each of said charging means comprising a plurality of metallic charging elements spaced about 2 to 4 mm. from said surface and arrayed in two parallel rows that are oriented substantially radially with respect to said disk;

blower means associated with each of said heads for blowing air on a portion of said surface to dislodge said particles therefrom, each of said blower means comprising a plurality of air outlets spaced no more than 3 mm. apart, and arranged in two rows parallel to and spaced outwardly from said rows of charging elements;

vacuum means associated with each of said heads for creating an area of reduced air pressure adjacent each of said surfaces and parallel to said rows of charging elements, thereby causing said particles to move away from said surfaces and toward said vacuum means, each of said vacuum means comprising an elongated cavity opening toward one of said surfaces and disposed parallel to and between rows of said air outlets; and attraction means associated with each of said heads for electrostatially attracting particles that have been charged by said charging means each of said attraction means comprising an elongated metallic attraction member to which an electostatic charge opposite to that of said charging means is imparted, each of said attraction members being spaced from one of said surfaces and disposed longitudinally within one of said cavities leaving on either side thereof an elongated slot for the passage of air and presenting a knife edge extending radially across said disk.